United States Patent [19]

Giocastro et al.

[11] Patent Number: 4,637,271

[45] Date of Patent: Jan. 20, 1987

[54] FLEXIBLE UNIVERSAL GEAR BOX SYSTEM WITH YOKES

[76] Inventors: Joseph Giocastro, 64-28 Metropolitan Ave., Middle Village; Salvatore Giocastro, 53-11 73rd St., Maspeth, both of N.Y. 11379

[21] Appl. No.: 652,002

[22] Filed: Sep. 19, 1984

Related U.S. Application Data

[63] Continuation-in-part of Ser. No. 448,846, Dec. 15, 1982, abandoned.

[51] Int. Cl.[4] .................... F16H 35/00; B60K 17/30
[52] U.S. Cl. ............................... 74/386; 180/261
[58] Field of Search .................... 74/385, 380, 386; 180/260, 261, 262

[56] References Cited

U.S. PATENT DOCUMENTS

| 667,465 | 2/1901 | Seeger | 74/385 |
| 707,695 | 8/1902 | Hoadley | 74/386 |
| 929,329 | 7/1909 | Rosenberger | 74/386 |
| 957,626 | 5/1910 | Rivers | 74/386 |
| 980,211 | 1/1911 | Daimler | 74/386 |
| 986,262 | 3/1911 | Berends | 74/386 |
| 1,006,925 | 10/1911 | Fautsch | 74/386 |
| 1,129,021 | 2/1915 | Schmit | 74/386 |
| 1,141,578 | 6/1915 | Peters | 74/386 |
| 1,145,762 | 7/1915 | Freeman | 74/386 |
| 1,155,315 | 9/1915 | McGeorge | 180/261 |
| 1,265,449 | 5/1918 | Hettrich | 74/386 |
| 1,309,074 | 7/1919 | Mckinnon | 74/386 |
| 1,340,759 | 5/1920 | Duncan | 180/262 |
| 1,852,226 | 4/1932 | Asam | 180/262 |
| 2,050,497 | 8/1936 | McCullum | 74/385 |
| 2,235,427 | 3/1941 | Harris | 74/385 |
| 2,346,143 | 4/1944 | Asam | 74/386 |
| 2,427,710 | 9/1947 | Bush | 180/262 |
| 2,716,899 | 9/1955 | Lado | 180/261 |
| 2,764,899 | 10/1956 | West | 74/385 |
| 2,792,858 | 5/1957 | Bryant | 74/385 |
| 3,395,868 | 8/1968 | Dodgen et al. | 74/385 |
| 3,463,029 | 8/1969 | Chow | 74/385 |
| 3,896,894 | 7/1975 | Vinton | 74/385 |

FOREIGN PATENT DOCUMENTS

| 872404 | 6/1942 | France | 74/385 |
| 1304724 | 8/1961 | France | 74/385 |
| 503747 | 12/1954 | Italy | 74/385 |
| 47053 | 3/1909 | Switzerland | 180/262 |
| 480969 | 3/1938 | United Kingdom | 180/261 |

*Primary Examiner*—Lawrence Staab

[57] ABSTRACT

A flexible universal gear box for motor vehicles that mounts a pair of yokes movable relative to one another about a pivot member. The yokes are secured to different portions of the motor vehicle. The pivot member can be the main drive shaft of the motor vehicle or the joined wheel axles of the front or rear wheels of the vehicle, as examples. A first shaft member or first and second shaft members pass through the respective bodies of the yokes and join respective bevel gears that in turn are meshed with a pivot bevel gear connected to the pivot member. The movement of one portion of the body of the vehicle relative to the other portion of the body of the vehicle moves one yoke relative to the other yoke and simultaneously causes the rotation of the affected bevel gear around the pivot bevel gear to which it is meshed by way of the simultaneous movement of the affected shaft members.

1 Claim, 11 Drawing Figures

FLEXIBLE UNIVERSAL GEAR BOX SYSTEM WITH YOKES

This application is a continuation of our earlier filed copending U.S. patent application, Ser. No. 448,846; filed Dec. 15, 1982, entitled Flexible Universal Gear Box System Embodying Yokes now abandoned.

BACKGROUND OF THE INVENTION

This invention relates to a universal gear box for motor vehicles, and more particularly to a flexible universal gear box made with a pair of flexibly connected yokes that can be used with mechanized equipment.

As far as the applicant is aware, universal gear boxes for motor vehicles are made with rigid housings that extend into the boxes by way of bearings and have the function of protecting the gears from contamination. These universal gear boxes, however, are, because of their rigidity, subject to whipping under stress with resultant vibrating characteristics that in turn can lead to a number of problems too numerous and varied to enumerate here. The rigidity, or inherent inability to bend, of the prior art universal gear boxes is simply a result of one-piece casting generally in a T or L configuration, so that stress is passed onto the axles and thus onto the bevel gearing.

SUMMARY OF THE INVENTION

The primary object of this invention is to provide a flexible universal gear box for a motor vehicle or other mechanized equipment.

Another object of this invention is to provide a flexible universal gear box having a pair or rotatably mounted yoke members that absorb stress passed on from the motor vehicle so as to bypass stress on the gearing.

A further object of the invention is to provide a flexible universal gear box for a motor vehicle with a pair of yokes rotatably mounted upon a pivot member with one of the yokes connected to the steering arm of the vehicle and passing an axle from the front wheel to a bevel gear that is connected via bevel gearing to an axle connected to the main drive shaft via the other of the yokes, wherein pull from the front end axle shaft is transmitted to the front wheel with a minimum of resistance over a 70 degree angle in each turning direction.

Still another object of this invention is to provide a flexible universal gear box having a pair of yokes rotatably mounted to a horizontal pivot member, the flexible gear box providing flexible, stress-free support for the universal gearing for the front or rear wheels of a motor vehicle.

It is a further object of this invention to provide a simple and inexpensive flexible universal gear box for a motor vehicle or other mechanized equipment that is efficient to operate and durable in use.

DETAILED DESCRIPTION OF THE INVENTION

Reference is now made in detail to the drawings wherein similar reference numerals indicate corresponding parts throughout the figures.

Before a detailed description of each of FIGS. 1–11, a short lead-in, or summary, of the aspect of the invention shown and described will be set forth.

Figure 1:
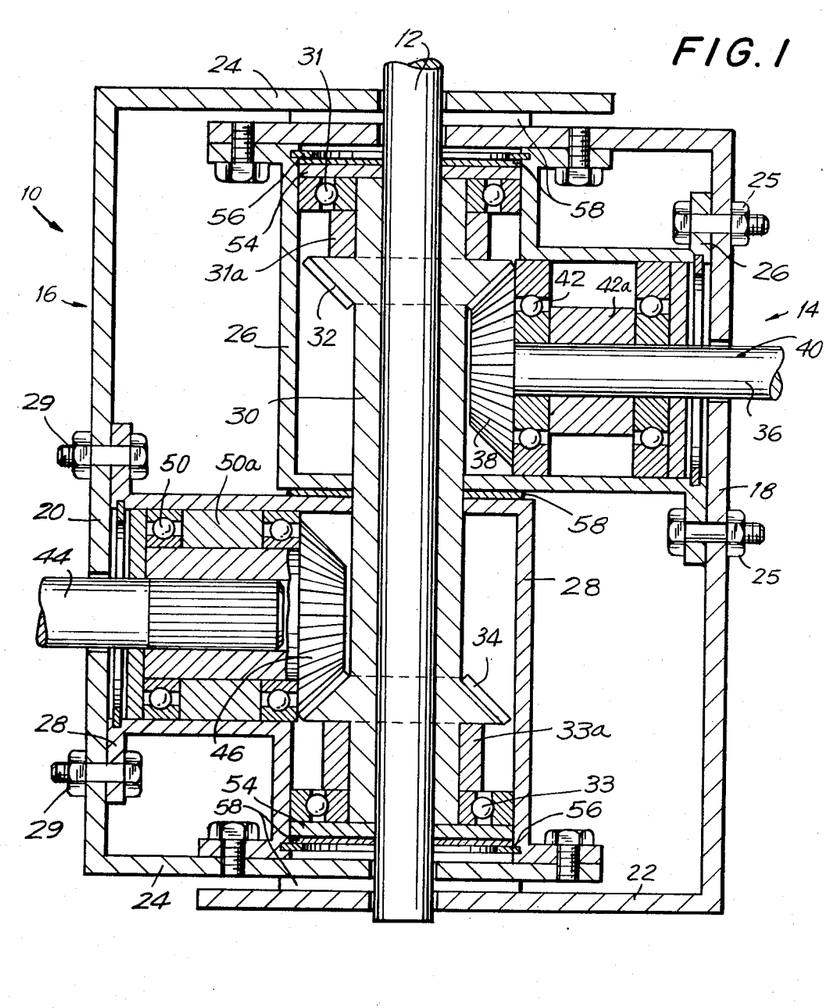
FIG. 1 is a rear elevational view of a flexible universal gear box with each of the yokes attached to a prior art universal gear box and secured to a vertical pivot member with the universal gearing joined to the axle of a front wheel of a motor vehicle.
Figure 2:
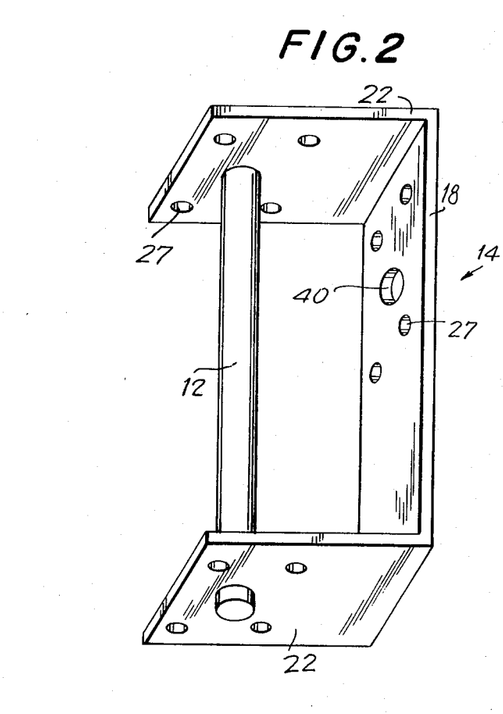
FIG. 2 is an isolated perspective view of one yoke and vertical king pin of the gear box shown in FIG. 1.
Figure 3:
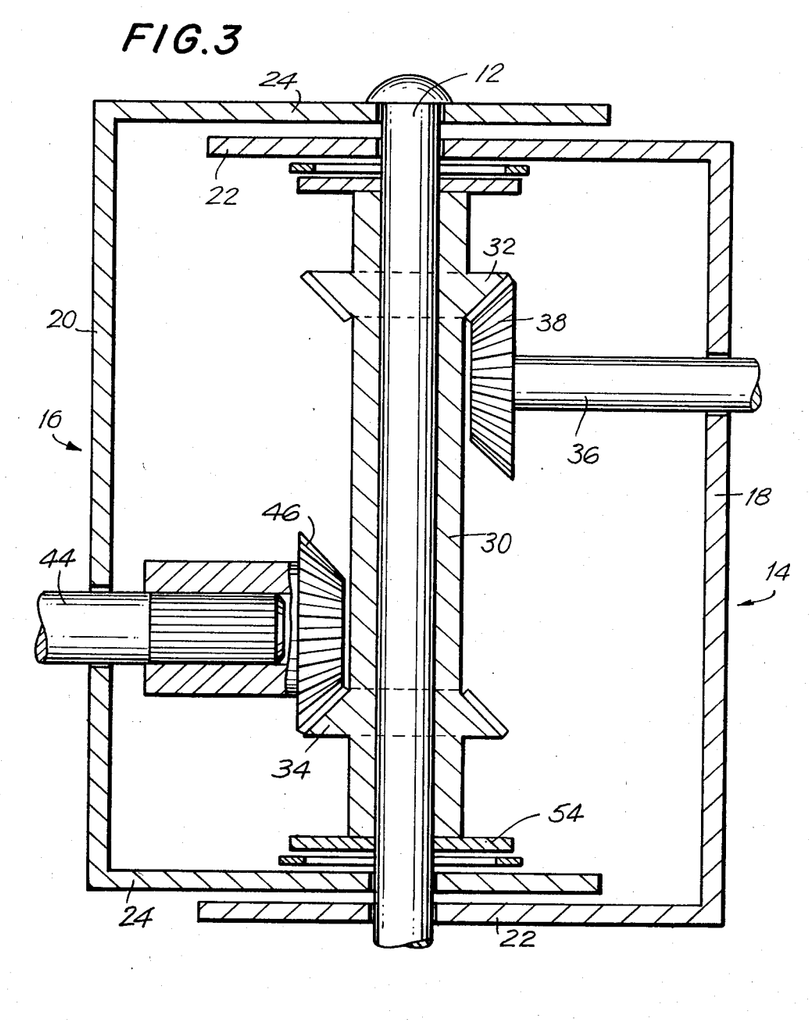
FIG. 3 is a simplified view of the gear box shown in FIG. 1.

FIGS. 1–6, and particularly FIGS. 1 and 3, illustrates in vertical cross-section a flexible steering wheel apparatus for the front wheels of a motor car. Drive shaft 44 is connected to the main drive shaft (not shown) of the vehicle, and drive shaft 36 is in fact the driven axle for a front wheel (not shown) of the vehicle. Yoke 16 is connected to the frame of the vehicle; and first shaft member 36 is connected to the steering apparatus of the vehicle. As the wheel of the vehicle turns, the wheel arm (not shown) of the vehicle turns at the same time, thus turning yoke member 14. Shaft member 36 can be rotated up to approximately 70 degrees forward and 70 degrees rearward from the normal vertical plane of shaft members 36 and 44. With this introduction in mind, the detailed description of FIGS. 1–6 will now follow.

FIG. 1 illustrates a preferred embodiment of the invention with a flexible universal gear box system 10 of a motor vehicle (not shown) including a generally vertical king pin, or first pivot member, 12 to which is rotatably attached a pair of oppositely positioned yoke members 14 and 16. Yoke members 14 and 16 include flat generally rectangular bodies 18 and 20 respectively, each having a pair of extending arms 22 and 24 respectively, having boxes adapted to rotatably receive first pivot member 12. The bevel gearing, which will be described, must be protected against contamination. For purposes of exposition, the means of accomplishing contamination prevention is shown as a pair of gear boxes 26 and 28. Analogous to prior art gear boxes, Gear box 26 is secured by bolts (not shown) through bolt holes 27 shown in FIG. 4 to body 18 of yoke member 14 and a similar second art gear box 28 is secured in a similar manner by bolts (not shown) to body 20 of yoke member 16. It is to be understood that prior art gear box 26 and yoke member 14 could be made as one integral yoke unit, as could prior art gear box 28 and yoke member 18. A drive hub 30 is rotatably mounted to pivot member 12 between yoke members 14 and 16.

Figure 4:
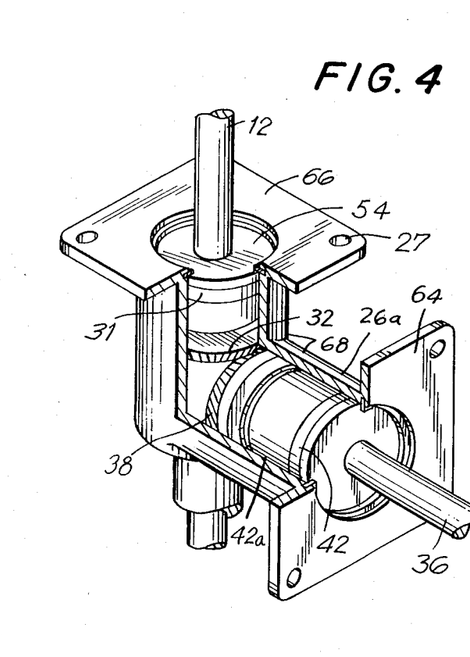
FIG. 4 is an isolated view of a prior art universal gear box analogous to the prior art universal gear boxes shown in FIG. 1.

Bearings 31, shown with spacer 31a, are mounted by first prior art gear box 26 for receiving the top portion of drive hub 30; and bearings 33 shown with spacer 33a are mounted by second gear box 28 for receiving the bottom portion of drive hub 30. A first hub bevel gear 32 is keyed to the top portion of drive hub 30 and a second hub bevel gear 34 is keyed to the bottom portion of drive hub 30. A first shaft member 36 is connected to a first shaft bevel gear 38 that is rotatably locked with second hub bevel gear 32. First shaft member 36 extends horizontally from pivot member 12 to a front wheel (not shown) of the motor vehicle. First shaft member 36 extends outwardly from pivot member 12 through an aperture 40 through body 18 of yoke member 14. A bushing (not shown) is preferably positioned in aperture 40. First shaft member 36 is also rotatably mounted by first gear box 26 at anti-friction bearings 42, shown with spacer 42a. A second shaft 44 is connected to a second shaft bevel gear 46 that is rotatably locked with first hub bevel gear 34. Second shaft member 44 extends horizontally from pivot member 12 to the main drive shaft (not shown) of the motor vehicle to which it is rotatably connected. Second shaft member 44 extends outwardly from pivot member 12 through an aperture 40 through body 20 of yoke member 16. A bushing (not shown) is preferably positioned in aperture 40. Second shaft member 44 is also rotatably mounted by second gear box 28 at antifriction bearings 50, shown with spacer 50a. Opposed washers 54 for holding the pivot gears in meshing position are positioned around pivot member 12 at the opposed inner surfaces of an upper arm 22 of yoke member 14 and a lower arm 24 of yoke member 16. Yoke members 14 and 16 are preferably of the same dimensions with yoke member 16 being vertically uppermost with arms 22 and 24 interlocking. A pair of snap rings 56 for locking washers 54 are positioned around pivot member 12 between washers 54 and the arms of yokes 14 and 16. An oil seal 58 is positioned around pivot member 12 between first and second gear boxes 26 and 28 and another oil seal 58 is positioned between washers 54 and arms 24 of yoke 16. As the wheel of the vehicle is turned, first shaft member 36 turns and the wheel arm of the vehicle turns at the same time, thus turning yoke member 14 by way of first gear box 26 being turned. First shaft bevel gear 38 at this time rotates around idler bevel gear 32. First and second horizontal shaft members 36 and 44 are normally positioned in parallel relationship with first and second hub bevel gears 32 and 34 together with hub 30 comprising an idler gear with hub 30 tending to keep gears 32 and 34 in relationship with first and second axle bevel gears 36 and 38 so that horizontal shaft members 36 and 44 are kept in normal parallel relationship. Not only is yoke member 14 capable of being turned about pivot member 12 relative to yoke member 16 as a result of the steering wheel of the vehicle being activated to turn the front wheels of the vehicle, but it also can be said that in certain circumstances yoke member 16 can be rotated about pivot member 12 relative to yoke member 14, as for example, when one or both of the rear wheels of the vehicle strike an obstacle in the road so as to shift the vehicle slightly. In such a case, yoke member 14 would remain stable relative to the road and yoke member 16 would be shifted slightly about first pivot member 12.

FIG. 2 is an isolated perspective view of yoke member 14 mounted with the king pin, or pivot member 12. FIG. 2 also shows aperture 40 for axle 36 and bolt holes 27 for securing first prior art gear box 26 to yoke member 14.

FIG. 3 is a stripped, or simplified, view of selected basic components of system 10 as shown in FIG. 1. First and second gear boxes 26 and 28 have been removed from this view along with the bearing supports.

FIG. 4 is a perspective view of a prior art gear box analogous to first gear box 26 and is designated 26a. Gear box 26a includes a vertical flange 64 bolted to body 18 of yoke member 14 and a horizontal flange 66 bolted to the upper arm of arms 22 with oil seal 58 of yoke member 14. Pivot member 12 and wheel axle, or first shaft member 36 are shown extending from the gear box. The vertical and horizontal portions of the body portion 68 of the gear box have been partly removed to show bevel gears 32 and 38 and bearings 31.

Figure 5:
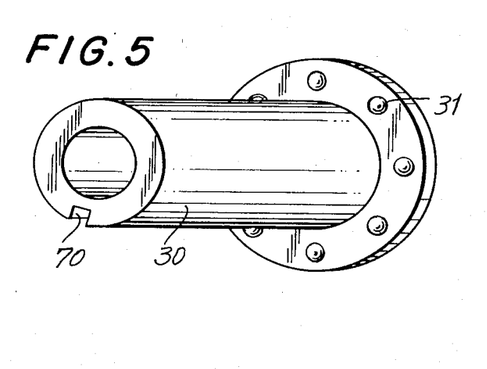
FIG. 5 is a perspective view of the drive hub shown in FIGS. 1 and 2.

FIG. 5 shows a perspective view of drive hub 30 shown in FIGS. 1-3 with a keyway 70 running the length of the hub adapted to accept a key member (not shown) extending from pivot member 12. One end of hub 30 is devoid of bearings 33 shown in FIG. 1 while the opposite end shows bearings 31.

Figure 6:
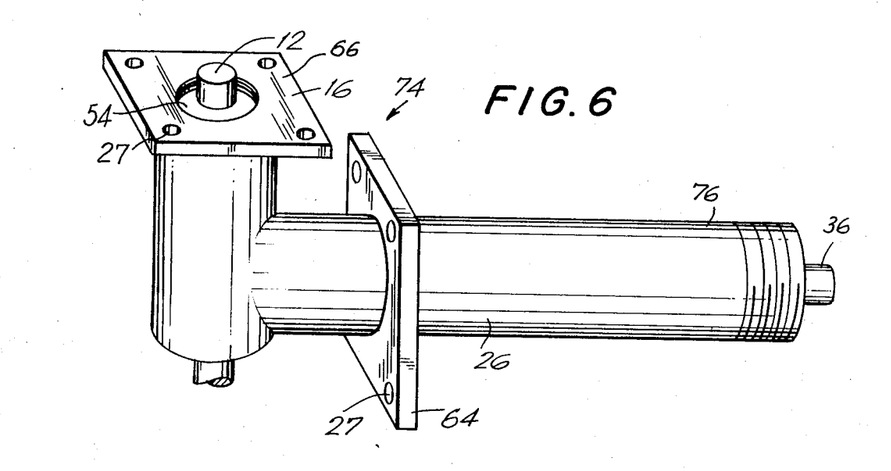
FIG. 6 is a perspective view of a dead axle embodiment of the gear box shown in FIG. 4.

FIG. 6 is a perspective view of an embodiment of the invention as described in FIGS. 1 and 4. The embodiment of FIG. 6 includes a prior art gear box 74 having a horizontally extending dead axle 76 that can be used to support the wheel (not shown) of FIG. 1 with wheel axle 36 being enclosed in the hollow formed by dead axle 76. Flanges 64 and 66 as in FIG. 4 have bolt holes 27 to secure gear box 74 to yoke member 14 of FIG. 1.

Figures 7, 8:
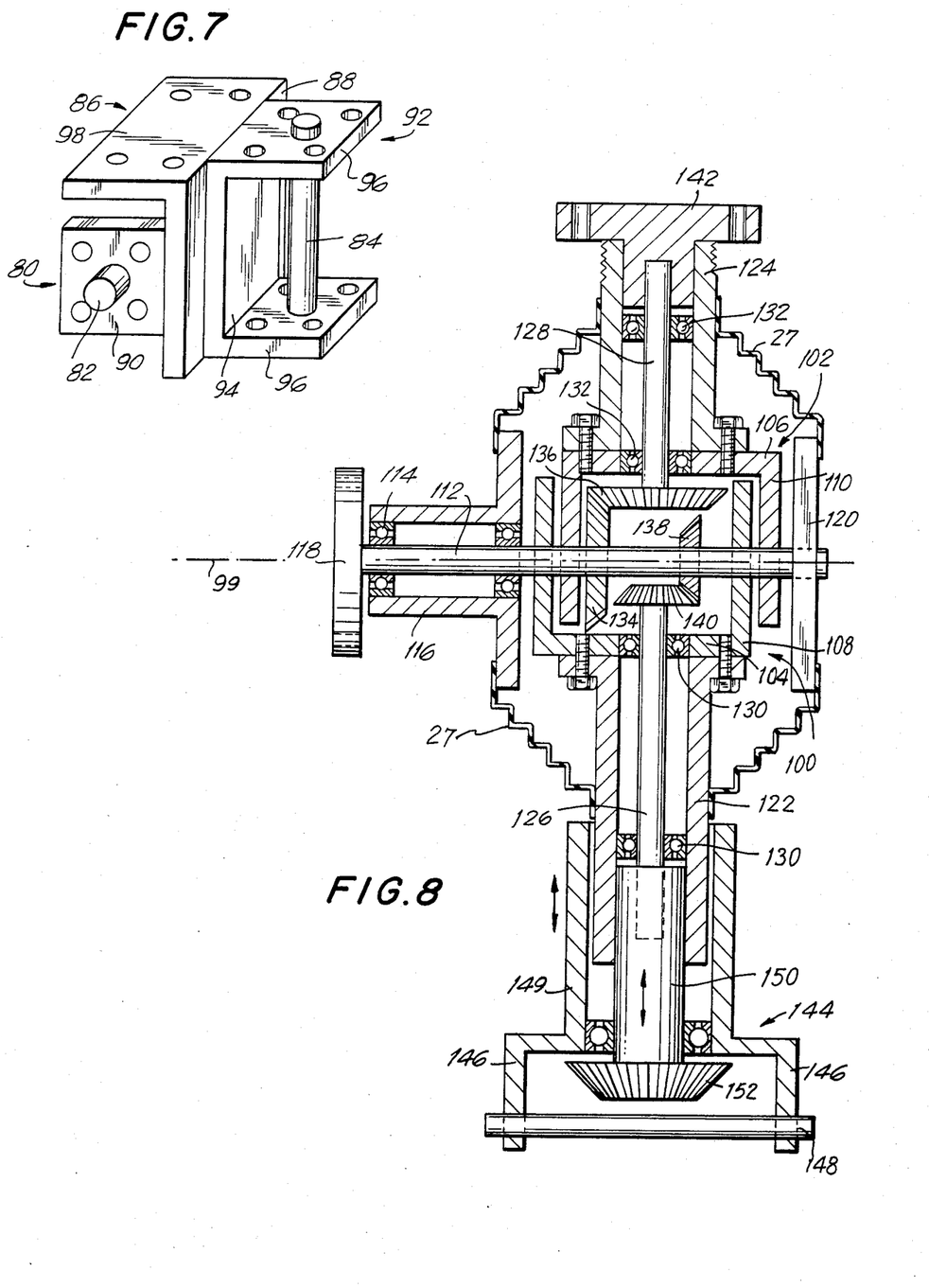
FIG. 7 is a perspective view of two half-systems secured together with one securing pivot member positioned vertically and the other pivot member positioned horizontally.
FIG. 8 is a top view of an embodiment of a universal four-gear box connected to the axles of the front or rear wheel of a motor vehicle with alternate types of wheel connections shown, one having a two-gear yoke system according to the present invention.

FIG. 7 shows a back-to-back yoke system 80 that includes a generally horizontal pivot member 82 and a generally vertical pivot member 84 with a yoke member 86 having a body portion 88 with extending arms 90 (one of which is shown) rotatably mounted around horizontal pivot member 82 and another yoke member 92 having a body portion 94 with extending arms 96 rotatably mounted around vertical pivot member 84. Yoke member 86 is one portion of a double yoke system as shown in FIG. 1 with a mating yoke (not shown) which likewise is rotatably mounted around pivot member 82; and yoke member 92 is one portion of another double yoke system as shown in FIG. 1 with a mating yoke (likewise not shown) which likewise is rotatably mounted around pivot 84. Yoke body portions 88 and 94 are connected back-to-back. The gear box associated with yoke member 86 will move vertically with body portions of the vehicle connected to the other yoke of the gear box. The other gear box associated with yoke member 92 moves horizontally for steering purposes. The top of yoke member 86 is provided with a horizontal flange 98 connected to body portion 88 so that a flat or coil spring can be mounted on the flange. This arrangement gives more vertical flexibility to the vehicle than the springs above would give.

FIG. 8 is separated by a phantom line 99 that divides the figure into two different embodiments of the invention as positioned at the opposed ends of the axle where the left and right rear wheels are mounted as will be described.

FIG. 8 is a top view of the invention as applied to the front or rear wheel axles of a motor vehicle. Rear wheels (not shown) are connected to a pair of opposed axles 126 and 128. For purposes of exposition, left rear wheel, connected to axle 126, is adapted to be connected to a local flexible universal gear box system according to the present invention that will be discussed in relation to FIG. 11. The left rear wheel (not shown) is secured to a yoke (not shown) that is rotatably mounted to pin 148 so as to function in mating relationship with yoke 14.

The the right rear wheel, connected to axle 128 is rigidly connected to a dead axle 124. Yokes 100 and 102, to which axles 126 and 128 are rotatably connected, are in turn both rotatably connected to a main drive shaft 112 via a four-gear arrangement so that axles 126 and 128 are rotatably movable about the central drive shaft, or pivot, 112 that is lateral relative to the vehicle. With this preliminary commentary in mind, a detailed description of FIG. 8 follows.

FIG. 8 is a top view of a four-gear embodiment of the present invention. A pair of opposed yoke members 100 and 102 having generally rectangular yoke body portions 104 and 106 respectively having pairs of extending arms 108 and 110 respectively are rotatably mounted at arms 108 and 110 by suitable bushings supporting a horizontal main drive shaft 112 of a motor vehicle (not shown). Main drive shaft 112 is supported by bearings 114 mounted to a body or frame portion 116 of the vehicle and further supported by a transverse flange 118 also connected to the the universal shaft of the vehicle at the bearing area; shaft 112 is supported on the opposite side of yoke members 100 and 102 at the rear end of the vehicle by a frame or body portion 120 of the vehicle in which shaft 112 rotates preferably supported by a bushing (not shown). It is to be noted that frame portion 116 and body portion 120 are both connected to portions of the body of the vehicle and are thus both unitary with the body of the vehicle. One hollow cylindrical dead axle 122 extends horizontally from body 104 of yoke member 100 on the left side of the vehicle and an opposite hollow cylindrical dead axle 124 extends horizontally from body 106 of yoke member 102 on the right side of the vehicle. It is again that phantom line 99 divides FIG. 9 into differing left and right side embodiments according to the present invention. Both dead axles 122 and 124 are in a unified structural connection with yoke members 100 and 102. An opposed pair of wheel axles 126 and 128 are rotatably positioned in the cylindrical hollows of dead axles 122 and 124, respectively. Wheel axles 126 and 128 extend through body portions 104 and 106 respectively of yoke members 100 and 102 where bushings are preferably placed to rotatably support the wheel axles. Bearings 130 and 132 are positioned in dead axles 122 and 124, respectively, for rotational support of wheel axles 126 and 128. A large bevel gear 134 is positioned between arms 108 and 110 of yoke members 100 and 102 on the forward side of the arms relative to the vehicle and is connected to main drive shaft 112. Another large bevel gear 136 likewise positioned between arms 108 and 110 is meshed at right angles with large bevel gear 134 and connected with wheel axle 128 so that main drive shaft 112 drive wheel axle 128. In a similar manner, a small bevel gear 138 is positioned between arms 108 and 110 on the rearward side of the arms relative to the vehicle and is connected to main drive shaft 112. Another small bevel gear 140 likewise positioned between arms 108 and 110 is meshed at right angles with small bevel gear 138 and connected with wheel axle 126 so that main drives shaft 112 drives wheel axle 126. Small bevel gears 138 and 140 are sized and positioned so as to clear large bevel gears 134 and 136. Before proceeding with a description of the unique action of yoke members 100 and 102, it is again noted that FIG. 8, for purposes of illustration and exposition, shows a different type of arrangement at the outer end portions of dead axles 122 and 124. The end of dead axle 124 is provided with a hub member 142 for a wheel (not shown) that includes a circular flange portion that is rotatably mounted within the hollow cylindrical portion at the end of dead axle 124. The end of dead axle 122 is provided with a yoke system according to the present invention so as to allow the wheel (not shown) attached thereto additional vertical movement. One of the two yokes is shown, namely yoke member 144 which is rotatably secured at its arms 146 to a horizontal pin member 148 laterally disposed to the motor vehicle and fastened by way of a hollow cylindrical portion 149 connected to arms 146 and that encloses the end portion of dead axle 122. A horizontal pivot member 150 positioned in the hollow cylindrical portion of the end of dead axle 122 is provided with a bevel gear 152 positioned between arms 146. Hollow cylindrical portion 149 with yoke 144 are slidably movable relative to the end portion of dead axle 122 so that the wheel can be accommodated for both vertical movements and transverse movements. Not shown is another yoke member that opposes yoke member 144 likewise rotatably connected to pin member 148 and connected to the hub (not shown) of the wheel of the vehicle. A flat spring, for example, is mounted on a base plate that is positioned over bevel gear 152 and secured to the top of arms of the yoke member (not shown) rotatably mounted to pin 148 opposite yoke member 144. With reference to yoke members 100 and 102 at the center portion of the vehicle, when the wheel attached to dead axle 124, for example, strikes an irregularity in the road, dead axle 124 along with yoke member 102 move vertically, wheel axle 128 rotates around main drive shaft 112, which in fact acts as a pivot, and wheel axle 128 simultaneously rises and rolls large bevel gear 136 around large bevel gear 134. Any vertical movement of the opposite wheel, after the yoke system there has absorbed the vertical movement, which will be described, will likewise be absorbed at yoke member 104, which will rotate, or move vertically, around main drive shaft 112 as wheel axle 126 rolls bevel gear 140 around bevel gear 138. Vertical wheel movement at the end of dead axle 122 is absorbed by the unshown yoke member rolling about pivot 148 as the unshown bevel rolls about bevel gear 152. Also shown in FIG. 8 is a pair of corrugated rubber dust covers 27 that cover the open areas of the center portion one of which is secured to dead axle 122 and body portions 116 and 120 and the other of which is secured to dead axle 124 and body portions 116 and 120. An anti-contamination box (not shown) secured to the body is connected to dust covers 27, so that yoke members 100 and 102 are completely shielded from dust and other contamination.

Figure 9:
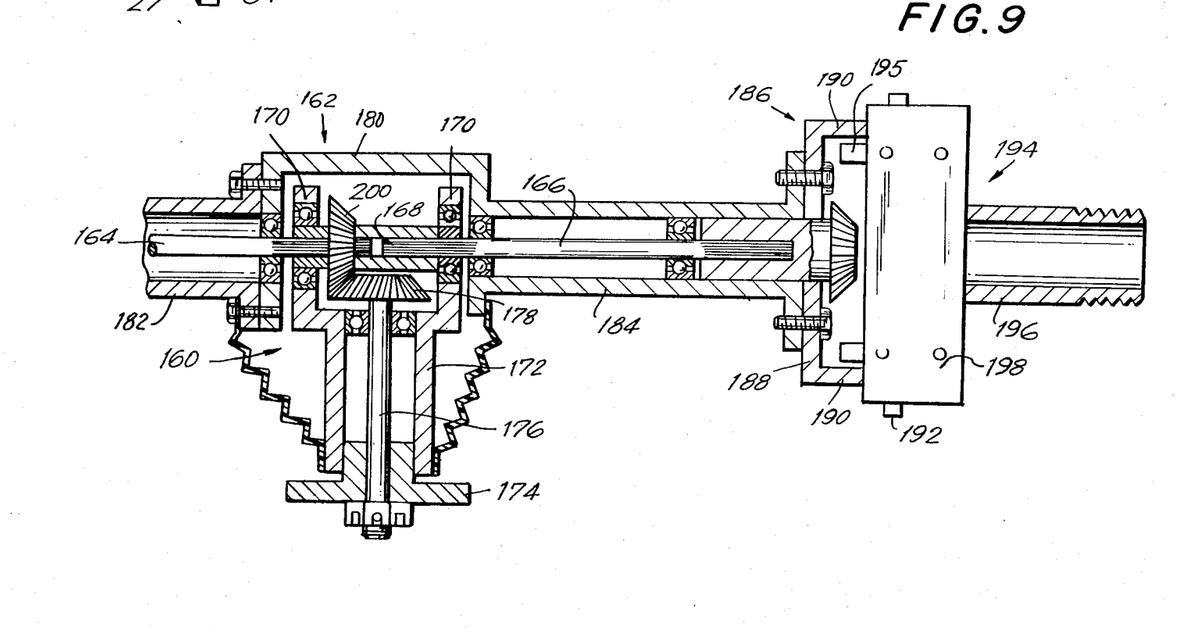
FIG. 9 is an embodiment of a top view of a universal two-gear box arrangement connected to the axles of the rear wheels of a motor vehicle.

FIG. 9 is a top view of the invention applied to the rear portion of a motor vehicle. An extended rear yoke member 162 and a front yoke member 160 are rotatably attached to a pair of wheel axles 164, 166 or their joining hub 168 so that the vehicle is flexibly movable about a pivot that is transverse relative to the vehicle. Main drive shaft 176 drives wheel axles 164 and 166 by way of a two-gear arrangement. Axle 166 is joined to a local flexible universal gear box system that will be discussed in relation to FIG. 11. With this preliminary commentary in mind, a detailed description of FIG. 9 follows.

FIG. 9 is a top view of a two-gear embodiment of the present invention. A pair of opposed yoke members 160 and 162 are rotatably mounted to a pair of opposed horizontal wheel axles 164 and 166 that are joined by a slip splined hub 168. Yoke member 160 includes a pair of spaced arms 170 through which axles 164 and 168 extend and between which hub 168 is positioned. Yoke member 160 also includes a hollow cylindrical member 172 connected to arms 170 which horizontally extend generally perpendicularly from axles 164 and 166 towards the front of the motor vehicle and are secured to a transverse flange 174 in turn connected to the universal axle shaft of the vehicle. A main drive shaft 176 rotatably mounted within hollow cylindrical member 172 extends through yoke member 160 to the area between arms 170. Main drive shaft 176 is connected to a first bevel gear 178 positioned between arms 170. Yoke member 162 includes a rear body portion 180 from which extend opposed hollow cylindrical axle housings 182 and 184 that extend toward the rear wheels (not shown) of the vehicle. Wheel axle 164 is rotatably positioned in axle housing 182, and wheel axle 166 is rotatably positioned in axle housing 184. Axle housing 184 is shown secured to a wheel yoke member 186 by bolting to the body portion 188 which in turn is connected to a pair of spaced arms 190 rotatably connected to a pivot member 192 laterally disposed relative to the vehicle. A second yoke member 194 includes a hollow cylindrical hub 196 with the body portion (not shown) also rotatably mounted to pivot member 192. A wheel (not shown) is secured to hub 196. A horizontal base plate 198 for a flat spring (not shown) is secured to the top of yoke member 194 the arms 195 of which are shown. This arrangement allows vertical movement of the wheel, which is secured to hub 196 and thus to yoke member 194, relative to rear yoke member 162, which is unitary with axle housing 184 and yoke member 186. The same arrangement (not shown) is present at the opposite wheel for wheel axle 168. A second bevel gear 200 is connected to splined hub 164 near wheel axle 164. Bevel gear 200 is at right angles to first bevel gear 178 and rotatably meshed with it. Second bevel gear 200 can as well be connected to splined hub 168 towards wheel axle 166 with the same effect as wheel axles 164 and 166 form a continuous transverse wheel axle since splined hub 168 so connects them together. When main drive shaft 176 is rotated, axles 166 and 164 are rotated by way of bevel gear 178 driving bevel gear 200. In operation, when either of the rear wheels of the vehicle rises or falls because of an irregularity in the roadway, yoke member 162 will rotate around axles 162 and 164 by way of axle housings 182 and 184; and at the same time second bevel gear 200 will roll around first bevel gear 178. Although the above described action would be the most common one, it is also true that the front portion of the vehicle could lower or raise yoke member 160 around axles 164 and 166 relative to yoke member 162 and at the same time rotate first bevel gear 178 around second bevel gear 200. With regard to the yoke system at the wheels, when a wheel rises or falls, the initial movement is absorbed by the spring and by yoke 194, which will rotate about pivot 192 relative to inner yoke 186. It is noted that inner yoke 186 can likewise rotate about pivot 192 relative to outer yoke 194. It is also noted that axle arm 182 is secured by bolts to yoke 162 for assembly purposes.

Figures 10, 11:
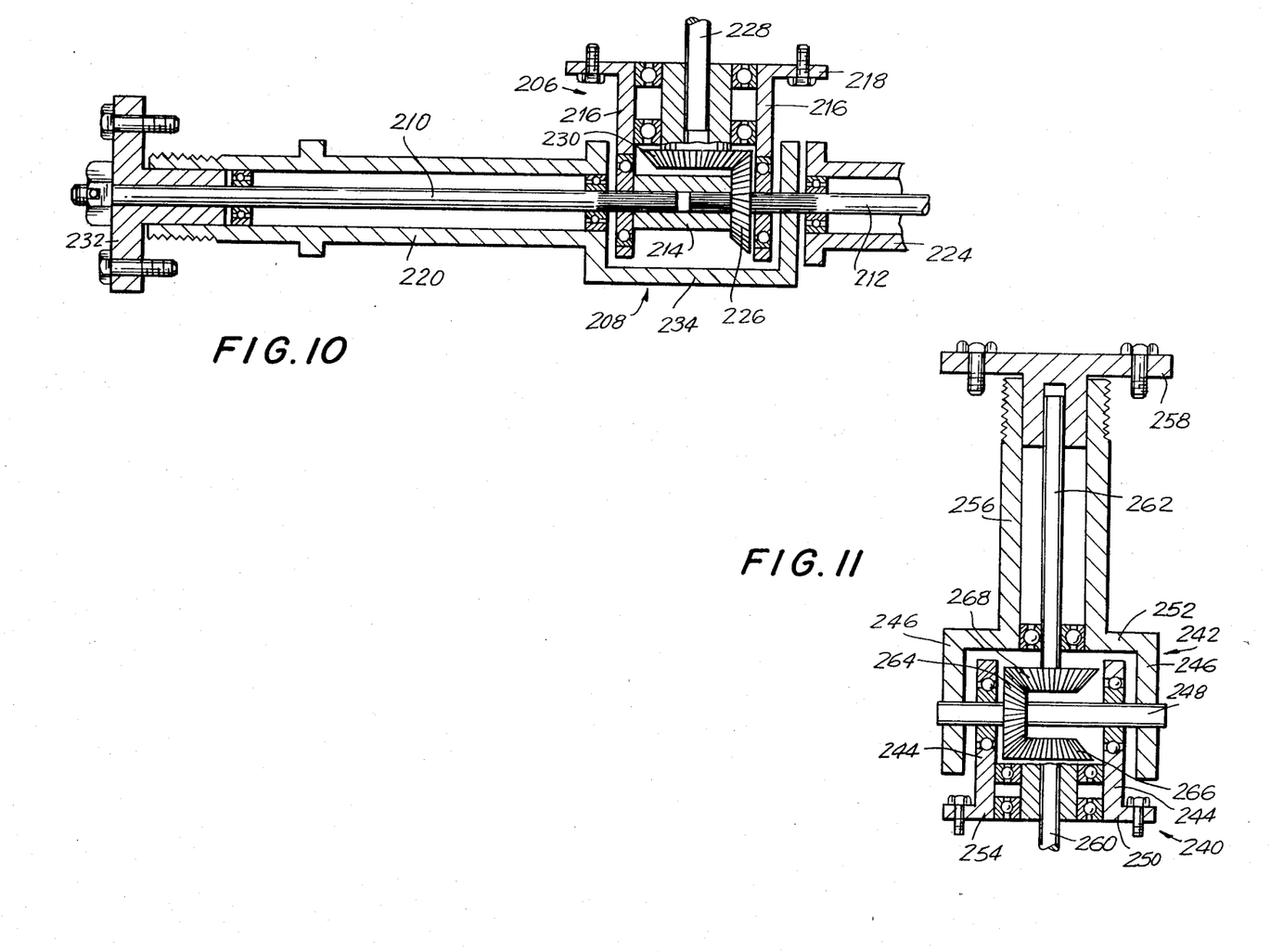
FIG. 10 is an embodiment of a top view of a two-gear universal gear box arrangement connected to the axles of the rear wheels of a motor vehicle.
FIG. 11 is an embodiment of a three-gear universal gear box arrangement connected to either the front or rear wheels of a motor vehicle.

FIG. 10 is a top view of the invention as applied to the rear portion of a motor vehicle. A main drive shaft 228 drives a rear cross-yoke 208 and an opposed front yoke 206 both rotatably connected by a two-gear arrangement to opposed rear wheel axles 210 and 212 or their connecting splined hub 214 so that the vehicle is flexibly movable about a pivot that is transverse relative to the vehicle. Axle 210 is connected to a rear wheel (not shown) by way of dead axle 220.

FIG. 10 is a top view of a two-gear embodiment of the present invention that is analogous to FIG. 9, except that the wheel area of the system is not vertically flexible as shown in FIG. 9. A pair of opposed inner and rear yoke members 206 and 208, respectively, are rotatably connected to a rear wheel axle of a motor vehicle, the rear axle comprising a pair of horizontally opposed wheel axles 210 and 212 joined by a splined hub 214. Inner yoke member is rotatably mounted to axles 210 and 212 by a pair of spaced arms 216 that extend perpendicularly to axles 210 and 212. Arms 216 extend forwardly in the motor vehicle to a transverse flange 218 which is bolted to the body of the vehicle. Rear yoke member 208 has a pair of horizontally opposed axle housings connected to a rear body portion 224 that opposes yoke member 206. Axle housings 220 and 224 contain wheel axles 210 and 212. A bevel gear 226 is connected to hub 214. A main drive shaft 228 is rotatably mounted through yoke member 216 by a bushing positioned between the forwardly extending portion of arms 216 yoke member 206 and is connected to a bevel gear 230 meshed at right angles to bevel gear 226. Both bevel gears and hub 214 are positioned at the rear center of the vehicles between the arms of the yoke members. A wheel hub 232 for a wheel (not shown) of the vehicle is rotatably mounted within axle housing 220 and keyed to wheel axle 210. Main drive shaft 228 rotates wheel axles 210 and 212 via bevel gears 226 and 230. The rear portion of the motor vehicle, namely rear yoke member 208, rotates about wheel axles 210 and 212 in response to variations in the roadway while at the same time axle bevel gear 226 rolls around main drive shaft bevel gear 230. It is noted that the rear wheels react directly to road variations, except for spring dampening. This is a less responsive, but also less costly system, than that shown in FIG. 9.

FIG. 11 is a top view of a local flexible universal gear box system according to the present invention as applied to the front of rear wheel of a motor vehicle in combination with the systems shown in FIGS. 8 and 9. The system in FIG. 11 gives an added lateral rotational flexibility to the rear wheels in addition to the transverse flexibility shown in FIGS. 8 and 9. A driver wheel axle 260 extending from, or integral with, for example, wheel axle 126 (FIG. 8) or wheel axle 166 (FIG. 9) drives a short axle 262 secured to wheel hub 258. Yokes 244 and 246 are rotatably mounted to cross-pin 248 that is lateral relative to to the vehicle. With this preliminary commentary in mind, a detailed description of FIG. 11 follows. It is noted that the embodiment shown in FIG. 11 can be mounted at the front or rear wheels of a vehicle alone and not necessarily in combination with the embodiments of FIGS. 8 and 9.

FIG. 11 shows a three-gear arrangement of the present invention positioned at the front or rear wheel (not shown) of the vehicle. A pair of opposed yoke members 240 and 242 are rotatably engaged at their respective spaced arms 244 and 246 to king pin member 248 of a motor vehicle with arms 242 being positioned outside of arms 240. Body portions 250 and 252 connecting respective arms 244 and 246 are further connected to horizontal dead axles 254 and 256, respectively. Axle 262 is connected to wheel hub 258. A pair of opposed wheel axles 260 and 262 are positioned in dead axles 254 and 256 respectively and extend through body portions 250 and 252 respectively of yoke members 240 and 242 with wheel axle 262 being shown connected to hub 258. Axle 260 is integral with a driven axle such as axle 126 of FIG. 8 or axle 166 of FIG. 9. A first bevel gear 264 positioned between arms 244 and 246 of yoke members 240 and 242 is connected to pin member 248. Opposed second and third bevel gears 266 and 268 connected to wheel axles 260 and 262 respectively are meshed with first bevel gear 264 so that axle 260 drives wheel axles 262. When the wheels of the motor vehicle move vertically because of irregularities in the road, yoke member 242 moves vertically by rotating about pin member 248 while the related bevel gear 268 rolls around first bevel gear 264.

The embodiment shown in FIG. 11 can be optionally used in a back-to-back configuration by adding a second horizontally movable system as shown in FIG. 1. That is, the embodiment of FIG. 11 can be positioned so that axle 260 of FIG. 11 is the same as axle 40 so that both horizontally and vertically flexible movements are simultaneously attained. This back-to-back configuration can be used not only at the front wheels of a vehicle as shown in FIG. 1, but at the rear wheels for specialized vehicles such as tractors or military vehicles for transversing rough terrain.

The invention having been particularly described, it is to be understood that the invention is not to be considered limited as to details herein set forth but that various modifications and changes of the embodiments described herein will occur to those skilled in the art. Such modifications are to be regarded as within the scope of the invention as defined by the appended claims.

We claim:

1. A flexible joint system associated with the front and rear portions of a motor vehicle, comprising, in combination:
   a generally horizontal pivot member
   a pair of opposed first and second yoke means rotatably connected to said pivot member said first yoke means being secured to the front portion of said vehicle and said second yoke means being secured to the rear portion of said vehicle, said final and second yoke means being movable relative to one another,
   a generally horizontal shaft member rotatably connected to and transversely passing through said first yoke means and disposed approximately perpendicular to said pivot member,
   first bevel gear means secured to said pivot member between said first and second yoke means,
   second bevel gear means perpendicular and meshing with said first bevel gear means and secured to said shaft member,
   said second yoke means being for rotating about said pivot member relative to said first yoke means and for rotating said second bevel gear means relative to said first bevel gear means in response to movement of said rear portion of said motor vehicle; and said first yoke means being for rotating about said pivot member relative to and for rotating said first bevel gear means relative to said second bevel gear means in response to movement of said front portion of said motor vehicle,
   first bearing means for rotatably supporting said pivot member relative to said first and second yoke means,
   second bearing means for rotatably supporting said shaft member relative to said first yoke means,
   said second yoke means being connected to the rear portion of said vehicle, said pivot member being axially connected to the rear axle of the rear wheels of said vehicle, said shaft member being the driving member and said pivot member being the driven member, said first yoke means beng connected to the front portion of said vehicle; whereby said vehicle is articulated about the pivot member between the front and rear portions of the vehicle.

* * * * *